(12) United States Patent
Stroppiana

(10) Patent No.: US 6,391,381 B1
(45) Date of Patent: May 21, 2002

(54) METHOD OF MANUFACTURING COVERINGS AND A COVERING PRODUCED THEREBY

(75) Inventor: Fernando Stroppiana, Grinzane Cavour (IT)

(73) Assignee: Mondo S.p.A. (IT)

( * ) Notice: Subject to any disclaimer, the term of this patent is extended or adjusted under 35 U.S.C. 154(b) by 0 days.

(21) Appl. No.: 09/483,471

(22) Filed: Jan. 14, 2000

(30) Foreign Application Priority Data

Jan. 15, 1999 (IT) .......................................... TO99A0023

(51) Int. Cl.[7] .............................. B05D 1/12; B05D 3/12; B32B 5/16
(52) U.S. Cl. ........................ 427/195; 427/198; 427/202; 427/370; 428/206
(58) Field of Search .............................. 427/194, 195, 427/198, 202, 203, 385.5, 370; 428/206, 207, 168, 187

(56) References Cited

U.S. PATENT DOCUMENTS 2,775,994 A * 1/1957 Rowe
4,816,318 A * 3/1989 Dorsey et al.
5,154,868 A * 10/1992 Heckel et al.

FOREIGN PATENT DOCUMENTS

EP 0 528 059 B1 2/1995
GB 2 291 649 * 1/1996

* cited by examiner

Primary Examiner—Fred J. Parker
(74) Attorney, Agent, or Firm—TraskBritt

(57) ABSTRACT

A method of manufacturing a covering comprises the steps of forming a laminar base layer (W), distributing decorative particles (P2) on the base layer (W), and fixing the decorative particles (P2) to the base layer (W). The base layer (W) is formed from a mixture having a homogeneously dispersed phase of further particles (P1). The decorative particles (P2) are distributed on the base layer (W) in a sparse arrangement substantially preventing overlapping of the particles. The uniformity of the appearance of the covering is nevertheless ensured by the further particles (P1) dispersed homogeneously in the mixture.

11 Claims, 1 Drawing Sheet

METHOD OF MANUFACTURING COVERINGS AND A COVERING PRODUCED THEREBY

BACKGROUND OF THE INVENTION

1. Field

The present invention relates to coverings such as, for example, floorings and, more specifically, to a method according to the preamble to claim 1.

2. State of the Art

Methods of this type, which provide basically for the preparation of a basic web on which particles with a decorative effect are subsequently distributed ("sewn") are known in the art as is shown, for example, by EP-A-0 528 059.

In the production of coverings of the type specified above, whether they be floorings based on artificial or synthetic resins (for example, polyvinyl chloride), or rubber-based floorings, it is necessary to take into account technical and production considerations, as well as considerations of an aesthetic nature.

In particular, there is a steady trend towards rendering the appearance of the covering particularly pleasing by coordinated selection of the colour characteristics of the basic web and of the particles distributed thereon.

The selection of the geometrical characteristics of these particles (in practice, their shape and size) and their colour distribution (uniform or variegated coloration) plays an important part in this connection.

In particular, when it is desired to take advantage of the shape and geometry of the particles distributed on the substrate, it may be important to arrange for the particles in question to be distributed in a sufficiently sparse arrangement to prevent or at least to limit overlapping between adjacent particles. This overlapping may in fact make appreciation of the geometrical characteristics of the particles more difficult.

BRIEF SUMMARY OF THE INVENTION

At the same time, however, a sparse arrangement of the particles may give rise to the disadvantage of the presence of fairly extensive and, moreover, unpredictably distributed areas of the basic web in which the number of particles becomes extremely small or is even zero. The limited presence or even absence of particles distributed in some regions of the flooring may be considered undesirable or disagreeable to the user.

The object of the present invention is to provide a solution to this problem.

According to the present invention, this object is achieved by means of a method having the specific characteristics recited in the following claims. The invention also relates to a covering which can be produced by the method.

BRIEF DESCRIPTION OF THE SEVERAL VIEWS THE INVENTION

Figure 1:
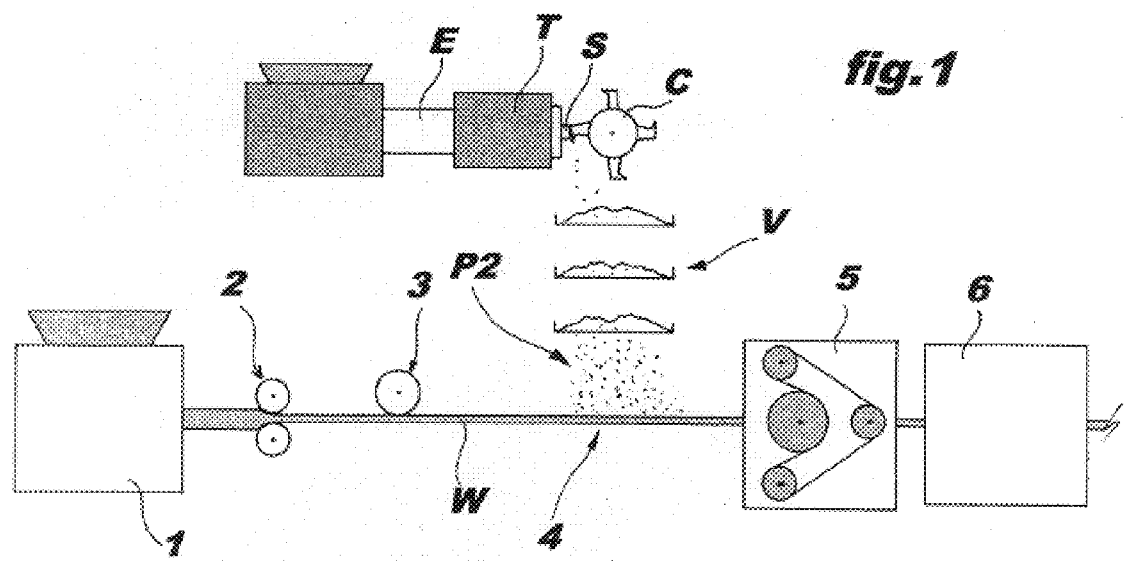
Figure 2:
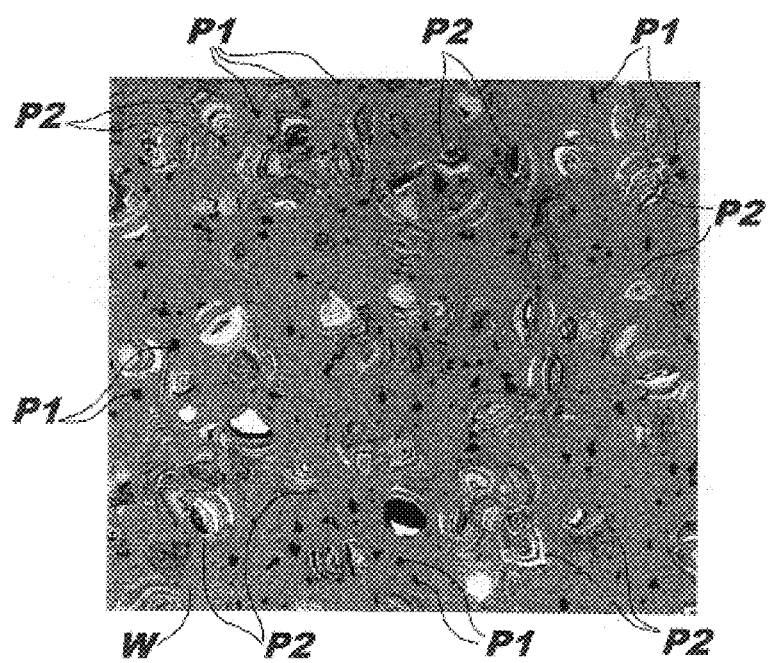

The invention will now be described, purely by way of non-limiting example, with reference to the appended drawings, in which:

FIG. 1 shows schematically the various steps of the implementation of the method according to the invention, and FIG. 2 shows the typical surface appearance of a covering produced in accordance with the invention.

DETAILED DESCRIPTION OF THE INVENTION

In the diagram of FIG. 1, a mixer device inside which a mixture of material subsequently to be subjected to a rolling operation is produced (in accordance with known criteria), is generally indicated 1. The rolling operation which is performed, for example, again in known manner, by a calender 2, is intended to lead to the formation of a laminar strip or web W constituting the base layer of the covering to be produced.

In a typical embodiment, the mixture produced in the mixer 1 is a rubber-based mixture (for example, based on SBR or EPDM rubber) in which a phase constituted by particles in granule form is uniformly dispersed.

The granules usually have a coloration (which is uniform or may be variegated within individual granules) contrasting with the uniform or dominant coloration of the base of the mixture.

In a currently preferred embodiment of the invention, these may be granules of vulcanized rubber typically having a particle size of between 0.8 mm and 6.0 mm.

In the embodiment shown, the basic component of the mixture is constituted by rubber which is not yet vulcanized.

The fact that, in contrast, the particles in granule form dispersed in the mixture are constituted by already-vulcanized material is intended to ensure that the granules retain a precise individuality during the homogeneous mixing performed in the mixer 1.

The web W resulting from the calendering operation performed at 2 (or from an equivalent rolling operation) is preferably subjected to a surface-finishing operation, for example, by mechanical surface removal performed in a machining station indicated 3, at least on the face corresponding to the upper or outer side of the finished covering.

This finishing operation has the purpose substantially of showing up the granules distributed in the mixture prepared in the mixer 1 by causing these granules (P1 in FIG. 2, which will be referred to further below) to appear on the surface of the laminar basic material (the web W) with a substantially uniform surface distribution resulting from the uniform dispersal of the granules achieved at the mixing stage.

At this point, further decorative particles P2, preferably constituted by plate-like particles of non-vulcanized rubber material, are distributed on the upper or outer face of the web W previously produced.

These plate-like particles (chips) are produced—in known manner—from an extrusion product S (a so-called thread) which is subjected to a cutting operation, usually performed by means of a rotary knife or blade C disposed immediately downstream of the extrusion head T.

Likewise in known manner, the thread S may have colour distribution characteristics which are uniform (since it is made of a material with uniform coloration) or differentiated. This result may be achieved, for example, by supplying strips of differently coloured extrusion material to the extruder E which produces the thread. The overall result thus achieved is due to the generally variegated or marbled appearance of the particles P2 produced for distribution on the surface of the web material W.

The decorative particles P2 typically have diametral dimensions of the order of a few millimetres (for example 3–10 mm) and preferably have geometrical details such as a polygonal, star-like, circular, elliptical, or rice-grain-like shape, etc.

During their transfer between the station in which they are formed (blade C) downstream of the extruder E and the region (indicated 4 herein) in which they are distributed on the sheet material which is to constitute the covering, the particles P2 are usually subjected to preparatory operations (for example, by screen and/or vibration means, schematically indicated V) for ensuring that the particles P2 are separated from one another (and hence are not grouped or clustered together) during distribution.

This is important, if it is borne in mind that the particles P2 are intended to be distributed in a sparse arrangement, of the order, for example, of 50–250 particles, according to diameter, per 10 cm×10 cm portion of the surface of the covering. In general, the term "sparse" arrangement is intended to define herein an arrangement intended substantially to prevent overlapping of the decorative particles P2.

Once the desired distribution has been achieved, the web W is advanced towards a treatment with the application of pressure and heat (preferably performed by apparatus 5 of the type currently known as "Rotocure" apparatus), bringing about vulcanization both of the base of the mixture constituting the material in the web W emerging from the rolling operation performed at 2 and of the particles P2 distributed on the surface of the web in the region 4. The decorative particles P2 are thus fixed to the basic web W.

The product of this operation is then subjected to further finishing operations (of known type), shown schematically at 6, for conferring on the covering, particularly on its upper or outer side, the desired final characteristics (for example, slight surface corrugations with an anti-slip function, etc.).

These latter treatment steps and the apparatus for performing them are widely known in the art and do not therefore need to be described herein.

The final effect achieved is that shown schematically in FIG. 2.

Both the granules P1 distributed uniformly in the mixture used to form the web W and the particles P2, usually of larger dimensions, distributed in a generally sparse arrangement on the surface of the covering, thus show up on the base W of the flooring.

The uniform distribution of the particles P1 gives rise to a phenomenon which may be defined as "visual homogenization" of the appearance of the covering. This phenomenon renders the presence of regions in the covering in which the distribution of the particles P2 is particularly sparse practically imperceptible even upon observation at close range.

In the covering produced in accordance with the invention, it is thus possible to make full use of the geometrical effect due to the characteristics of the particles P2, taking advantage, in particular, of the fact that these particles are generally separated from one another and can thus be appreciated with regard to their shape characteristics without this being translated into a disagreeable effect due to these particles being excessively spaced out in some regions of the covering.

Naturally, the principle of the invention remaining the same, the details of construction and forms of embodiment may be varied widely with respect to those described and illustrated, without thereby departing from the scope of the present invention as defined by the following claims. This applies in particular with regard to the fact that the covering according to the invention may be produced with materials other than the rubber-based materials referred to in the foregoing illustrative description.

What is claimed is:

1. A method of manufacturing a covering, comprising the steps of:
    forming a mixture by introducing vulcanized particles into an unvulcanized basic material and homogenously distributing said vulcanized particles throughout said unvulcanized basic material;
    forming said mixture into laminar web, wherein said vulcanized particles are distributed over an upper surface of said web;
    distributing particles of non-vulcanized material on said upper surface of said laminar web, to avoid overlapping of said particles of non-vulcanized material;
    applying pressure and heat to said laminar web to achieve vulcanization of said unvulcanized basic material of said laminar web and said particles of non-vulcanized material.

2. The method according to claim 1, wherein the particles of non-vulcanized material have diametral dimensions between 3 mm and 10 mm.

3. The method according to claim 1, wherein the vulcanized particles have a particle size between 0.8 mm and 6.0 mm.

4. The method according to claim 1, wherein, before the distribution of the particles of non-vulcanized material, the laminar web is subjected to a surface finishing operation which exposes the vulcanized particles at least on the upper surface.

5. The method according to claim 1, wherein the mixture is a rubber-based mixture.

6. The method according to claim 1, wherein the particles of non-vulcanized material are made of a rubber-based material.

7. The method according to claim 1, wherein the vulcanized particles are made of a rubber-based material.

8. The method according to claim 2, wherein the vulcanized particles have a particle size between 0.8 mm and 6.0 mm.

9. A method of manufacturing a covering, said method comprising:
    forming a mixture by introducing vulcanized particles into an unvulcanized basic material and homogenously distributing said vulcanized particles throughout said unvulcanized basic material;
    forming said mixture into laminar web, wherein said vulcanized particles are distributed over an upper surface of said web;
    effecting a surface finishing operation on said upper surface;
    distributing platy particles of non-vulcanized material on said upper surface of said laminar web, to avoid overlapping of said platy particles of non-vulcanized material; and
    applying pressure and heat to said web to achieve vulcanization of said unvulcanized basic material of said web and said platy particles of non-vulcanized material.

10. A method of manufacturing a covering, said method comprising:
    forming a mixture by introducing vulcanized particles into an unvulcanized basic material and homogenously distributing said vulcanized particles throughout said unvulcanized basic material;
    forming said mixture into laminar web;
    distributing platy particles uniformly over an upper surface of said laminar web;
    distributing platy particles of non-vulcanized material on said upper surface of said laminar web, to avoid overlapping of said platy particles; and
    applying pressure and heat to said web to achieve vulcanization of said unvulcanized basic material of said web and said platy particles of non-vulcanized material.

11. A covering produced by the following method:

forming a mixture by introducing vulcanized particles having dimensions of between 0.8 mm and 6 mm into and unvulcanized basic material and homogenously distributing said vulcanized particles throughout said unvulcanized basic material;

forming said mixture into a laminar web, wherein said vulcanized particles are distributed over an upper surface of said web;

distributing particles of non-vulcanized material having dimensions of between 3 mm and 10 mm on said upper surface of said laminar web, to avoid overlapping of said particles of non-vulcanized material and achieve a distribution of 50–250 non-vulcanized particles per 10 cm by 10 cm area of said laminar web;

applying pressure and heat to said laminar web to achieve vulcanization of said unvulcanized basic material of said laminar web and said particles of non-vulcanized material.

* * * * *